April 13, 1926.
W. OWEN
1,580,159
APPARATUS FOR FORMING OPTICAL BLANKS
Filed May 13, 1924  4 Sheets-Sheet 1
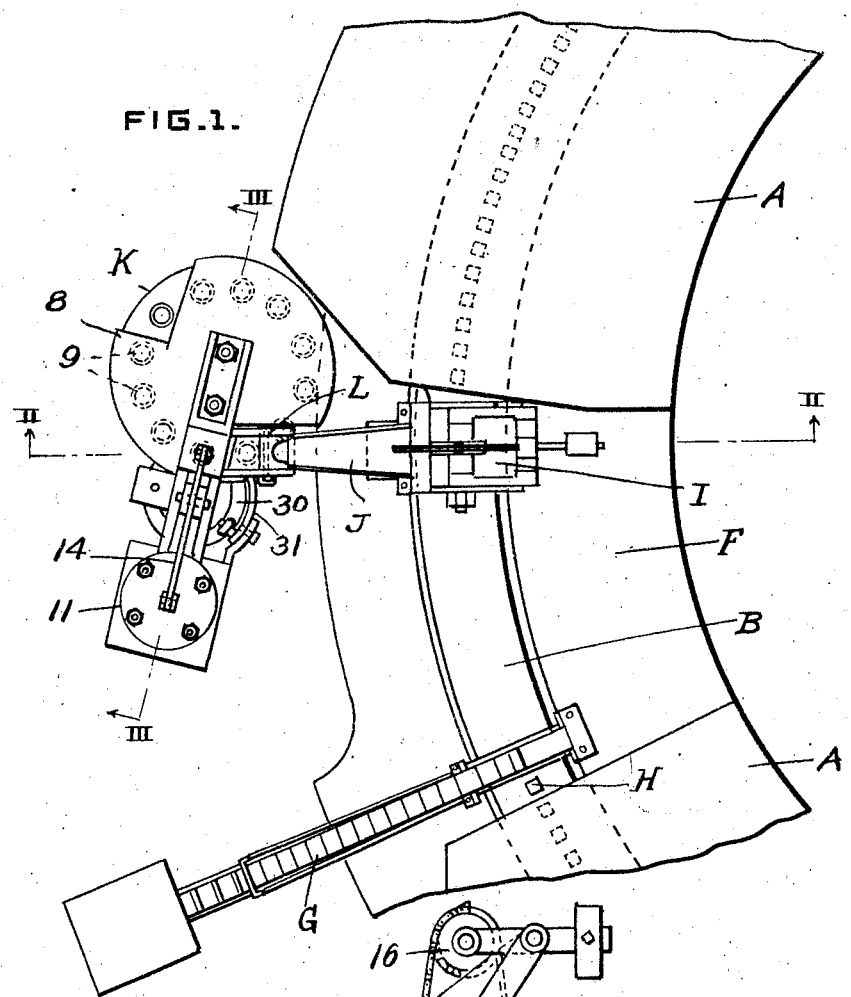
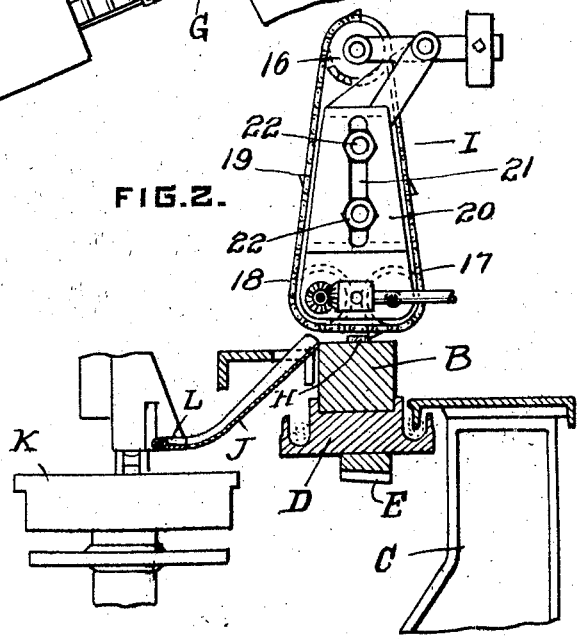
INVENTOR
Wm Owen
by
James C. Bradley
atty

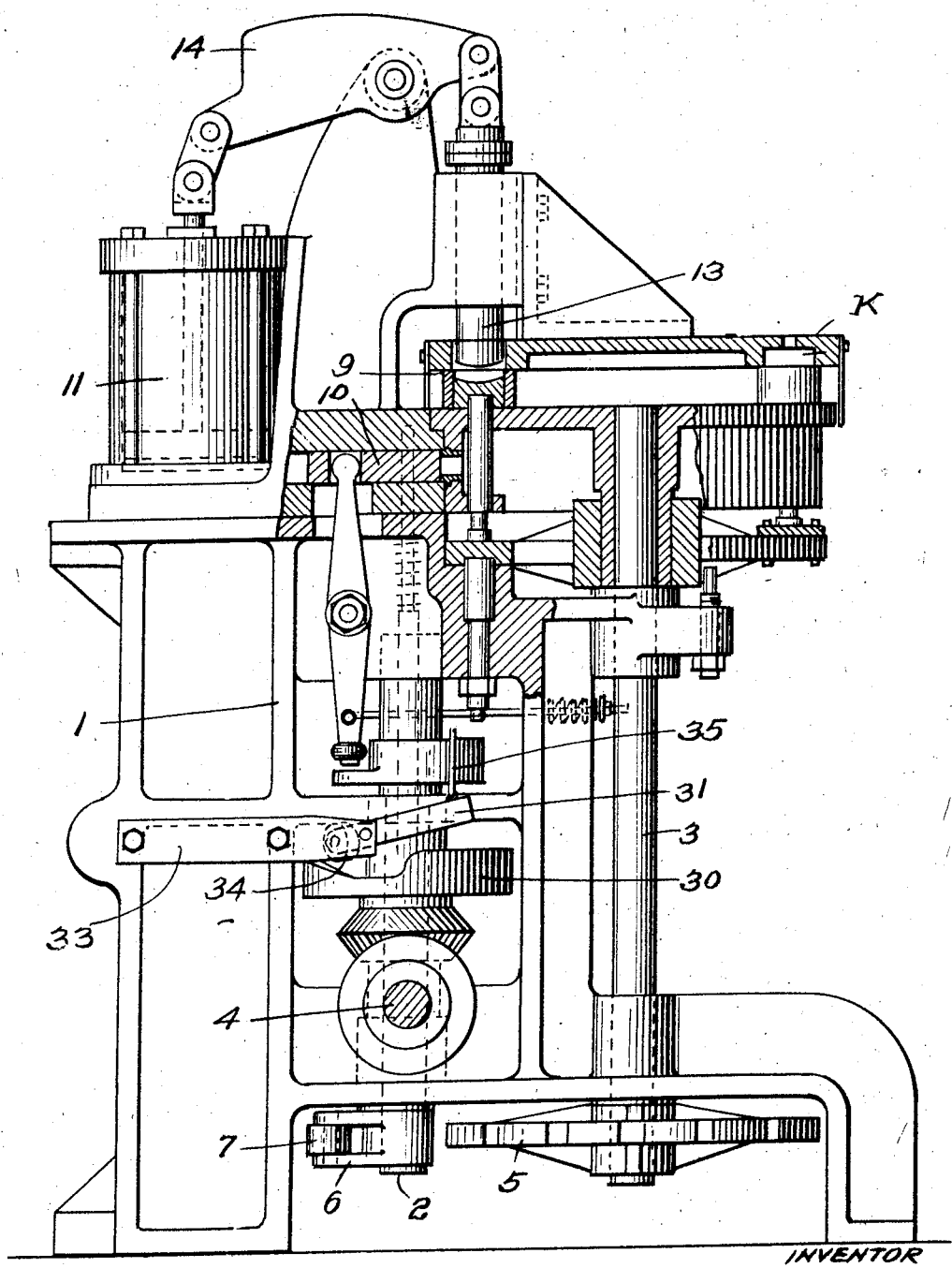

April 13, 1926.

W. OWEN 1,580,159

APPARATUS FOR FORMING OPTICAL BLANKS

Filed May 13, 1924      4 Sheets-Sheet 3

INVENTOR

April 13, 1926.

W. OWEN 1,580,159

APPARATUS FOR FORMING OPTICAL BLANKS

Filed May 13, 1924　　4 Sheets-Sheet 4

INVENTOR
Wm Owen
by
James C. Bradley
atty

Patented Apr. 13, 1926.

1,580,159

UNITED STATES PATENT OFFICE.

WILLIAM OWEN, OF PITTSBURGH, PENNSYLVANIA, ASSIGNOR TO PITTSBURGH PLATE GLASS COMPANY, A CORPORATION OF PENNSYLVANIA.

APPARATUS FOR FORMING OPTICAL BLANKS.

Application filed May 13, 1924. Serial No. 713,081.

*To all whom it may concern:*

Be it known that I, WILLIAM OWEN, a citizen of the United States, and a resident of Pittsburgh, in the county of Allegheny and State of Pennsylvania, have made a new and useful invention in Improvements in an Apparatus for Forming Optical Blanks, of which the following is a specification.

Figure 4:
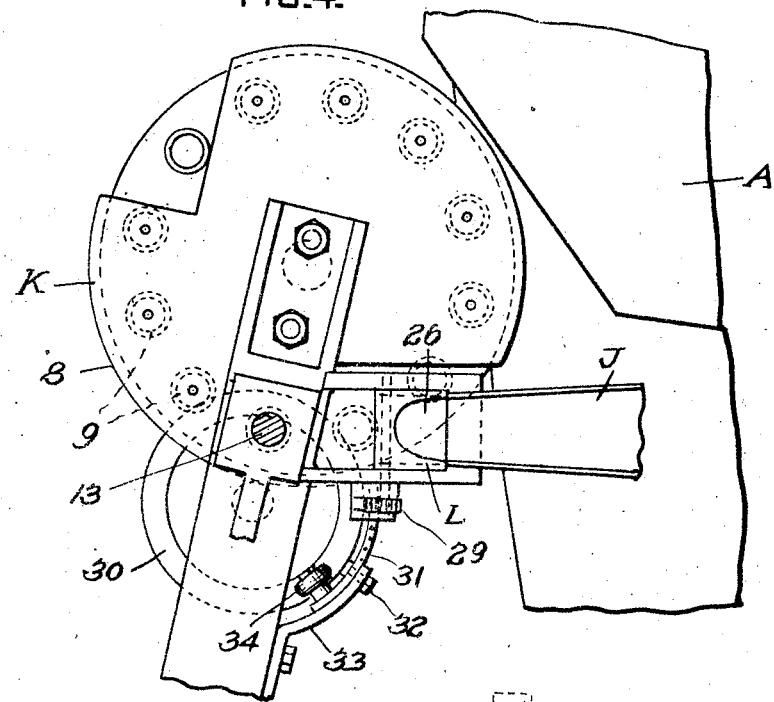
Figure 5:
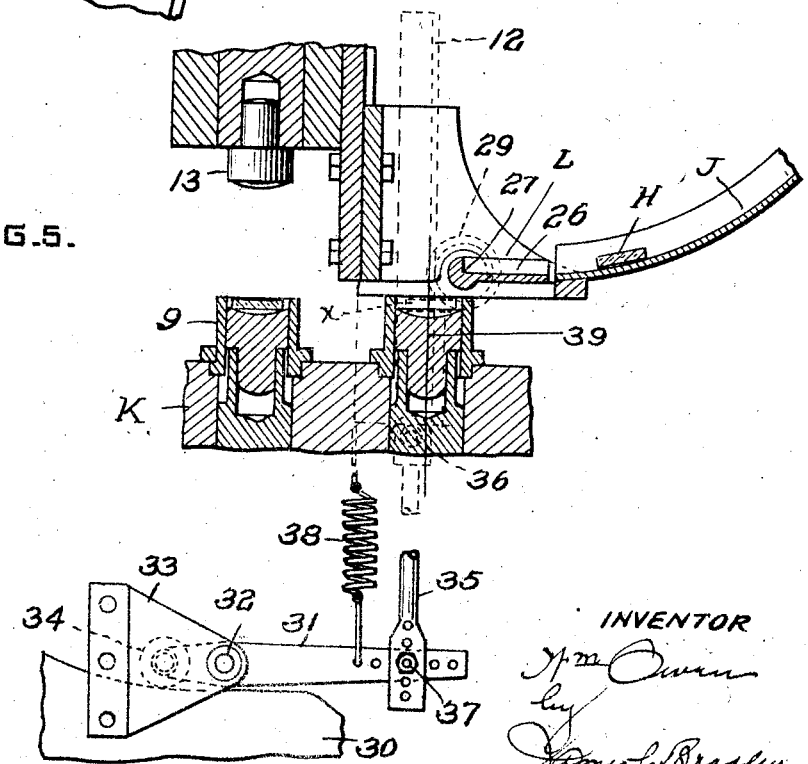
Figure 6:
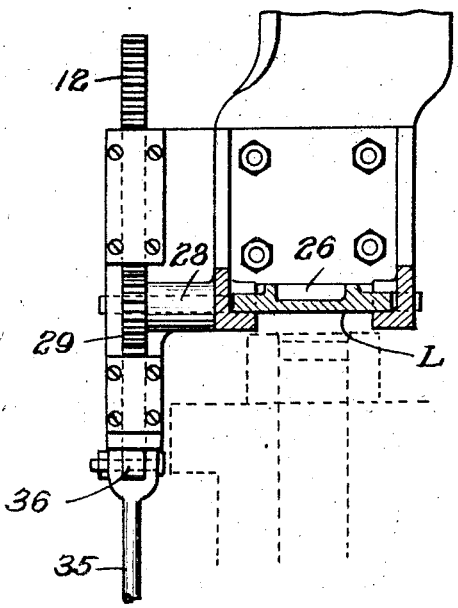
Figure 7:
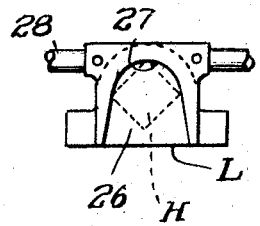
Figure 8:
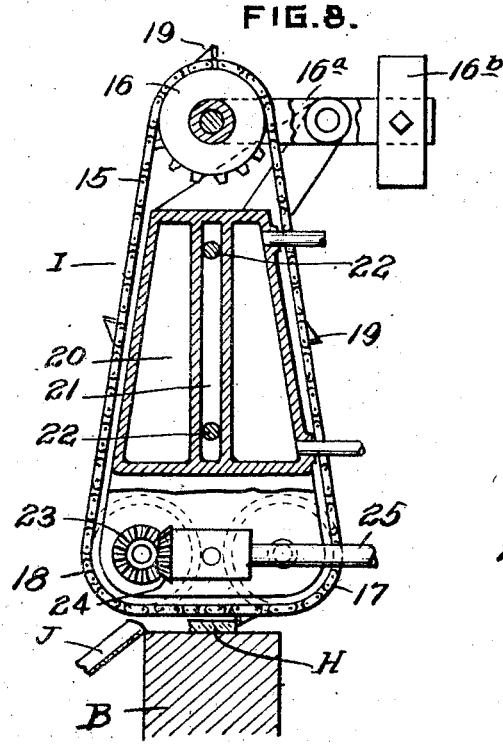
Figure 9:
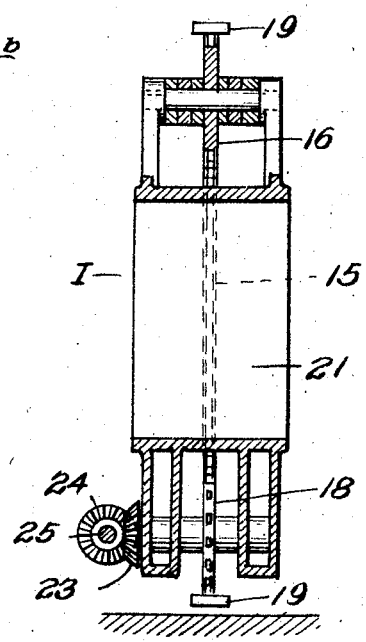

The invention relates to apparatus for forming optical blanks of all kinds, such as those used for spectacles and lenses of various kinds, and particularly, to the means for transferring the blanks from the heating apparatus to the press. It has for its principal objects the provision of improved means of very simple construction for accomplishing the transfer of the blanks as above specified, so that (1) they are positioned with accuracy and certainty in the mold cavities, and so that (2) a part of the corners of the blanks are slightly rounded, insuring a proper seating of those blanks in the mold cavities, which are a trifle over size and which otherwise might not be flat in such cavities. One embodiment of the invention is illustrated in the accompanying drawings wherein:

Figure 1 is a diagrammatic plan view showing a part of the apparatus. Fig. 2 is a section on the line II—II of Fig. 1. Fig. 3 is a section on the line III—III of Fig. 1. Fig. 4 is a partial plan view of the press with certain of the parts removed to more clearly show the construction beneath. Figs. 5, 6 and 7 are enlarged detail views of the turn over device. Figs. 5 and 6 being sections at right angles to each other. And Figs. 8 and 9 are two detail views of the endless pusher device, the sections being taken at right angles to each other.

In carrying out the invention in its preferred form, an annular heating chamber for the blanks is employed for bringing them to a plastic condition for molding or pressing in a press molding machine located alongside the furnace at the discharge side thereof. A transfer device is provided between the carrier of the heating chamber and the press or molding machine together with means for turning the blanks upside down before they are placed in the press, and it is to these devices that the invention is particularly directed, no claim being made herein to the general combination involving the annular furnace, the press, and transfer means herebetween. The furnace is provided with an endless carrier, to which the blanks are fed, and heating means are provided so that these blanks during their progress through the chamber are raised to a temperature slightly in excess of that required for molding, but at the same time below the melting point of the glass, so that they may be readily transferred to the press without sticking. The invention is not limited to a heating furnace which is annular in form, although this is the preferred form, and the press is not limited to any particular type, although the preferred one is of the kind shown, involving a rotating platen or table with a plurality of mold cavities in combination with a plunger, the rotation of the table step by step being timed with respect to the operation of the plunger and with respect to the feed of the blanks from the heating furnace to the press, and the arrangement being such that a blank is fed to one of the cavities, while the platen or table is stationary, after which it is fed ahead one step and stopped, while the plunger operates to press the blank into the cavity, another blank being at this time fed into the next cavity of the table. The press is preferably located below the level of the furnace, so that the transfer may be accomplished by gravity, but the invention is not limited to this feature. As illustrated, the blanks are shoved off of the annular carrier by means of a continuous pusher device and into the upper end of an inclined chute, which carries them down to the turnover device. This turnover device is pivoted to swing through an arc of 180 degrees and in its inverted position fits over one of the cavities of the mold, so that the turnover device inverts the blank and deposits it in the mold cavity preliminary to pressing. The inertia of the blank in sliding down the chute is utilized to round a part of the corners of the blank incident to the impact when the blank is stopped, so that the maximum overall dimensions of the blank are slightly reduced, tending to make them drop into the mold cavities more readily. The turning over of the blank is desirable, as this operation results in giving a pressed blank which is comparatively free from defects on one side, all of the defects incident to heating and pressing being upon the other side. These defects consist of the impress of the hearth or carrier on the side of the blank which engages the hearth and of the fin which is formed in the pressing operation incident to an excess of glass in the blank which is being pressed, such fin being formed on the side next to the plunger. The turning over of the blanks, therefore, brings the upper or unmarred surface of the blank so that it faces down in the mold, and is free from any marring effect produced by the pressing. The precise form of annular heating chamber and molding machine forms no part of the present invention and is shown in greater detail in the application, Serial No. 618,087, filed Feb. 9, 1923, the present invention relating particularly to the means for removing the blanks from the hearth or carrier and transferring them to the press in such manner that they are inverted in position.

Referring first to the general arrangement of parts, as indicated in Figs. 1 to 4, A is the annular heating chamber for the blanks which is provided with a carrier B housed in the chamber and made of refractory material, such as clay; C is the framework of the machine upon which the carrier is mounted for rotation, being supported by the annular casting D and driven from the circular rack E; F is an opening caused by cutting away the chamber A so as to expose the top of the carrier and give an opportunity of feeding the blanks to such carrier and removing them therefrom; G is a feeding device for supplying the blanks H, one by one, to the carrier B at suitable intervals; I is a pusher device for removing the blanks from the carrier B after they have made the circuit of the furnace and arrived at a point opposite the press at a temperature suitable for shaping or molding; J is a chute for receiving the blanks from the pusher device and conducting them to the press; K is the press, also referred to as the molding or pressing machine; and L is a turnover device for turning the blanks upside down and depositing them in the mold cavities of the press table, for the purpose heretofore recited. In operation, the blanks are fed onto the annular carrier B by means of the feeder G, after which they make the circuit of the tunnel chamber and are gradually heated until they arrive at the push off device I, at which point they have reached a temperature such that the glass is plastic and ready for molding. They are then fed into the top of the chute J and move by gravity to the turnover device L, at which point they are inverted and placed in the mold cavities, the press being stopped at the time the turnover device is operating, at which interval, the plunger of the press also operates to press the blank in advance of the one which is being positioned.

The press will be described only in enough detail to indicate its general construction, as this press constitutes no part of the present invention. It comprises a frame 1 carrying a pair of vertical shafts 2 and 3, the shaft 2 being continuously driven from the shaft 4, while the shaft 3 is given a movement of rotation by the intermittent gear drive comprising the notched wheel 5 and the arm 6 carrying the roller 7 for engaging the notches in the wheel 5. The shaft 3 carries the mold table 8 provided with the cavities 9, while the shaft 2 carries a plurality of cams for operating the indexing member 10, the air valves for the cylinder 11, and the vertical rack 12 for moving the turnover plate or member L. The plunger of the air cylinder operates the plunger 13 for pressing the blanks into the mold cavities, the connection between the two plungers including the rocker arm 14, as indicated in Fig. 3.

The device for feeding the blanks from the annular carrier or hearth B is shown in Figs. 8 and 9, such device comprising an endless belt or carrier consisting of the chain 15 passing around the sprockets 16, 17 and 18 and provided at intervals with the pusher blocks 19, the speed of movement of the chain being regulated with respect to that of the carrier B so that the blocks 19 engage the glass blanks H as they arrive opposite the chute J and carry them into the upper end of the chute. The sprockets 16, 17 and 18 are carried by the frame 20, having the longitudinal slot 21, by means of which it is secured for vertical adjustment against the end wall of the furnace chamber, transverse stud bolts 22 being employed for this purpose. The sprocket 16 is mounted so as to keep the chain 15 tight by supporting its axle upon the lever 16$^a$, which is counterweighted as indicated at 16$^b$. The sprocket 18 is driven by means of the bevel gears 23 and 24, the latter being connected to a shaft 25 driven in any suitable manner. The arrangement of the continuous pusher device in the form illustrated in Figs. 8 and 9 with the long flights of the chain extending vertically, is advantageous as this permits of the cooling of the chain and pusher blocks without the necessity of using artificial means for this purpose.

The transfer chute J is in position to receive the blanks and has its lower end terminating in position to discharge to the turnover plate L, as indicated in Fig. 5. This plate L is provided in its upper face with a circular recess 26, open on the side toward the end of the chute, thus giving a shoulder 27 against which the blanks impinge, as they are discharged from the chute. At this time, the blanks are relatively soft and plastic so that the impact is sufficient to slightly round the corners of the blank coming in contact with the curved shoulder 27. In this manner, at least two of the corners of the blank are always round (Fig. 7), so that the overall diagonal dimensions of the blank are slightly reduced. This renders the blank more liable to drop into the mold cavity without catching at the corners, which would otherwise sometimes happen with blanks which were slightly oversize. The turnover plate is carried by the pivot pin 28 provided at its end with the pinion 29 engaging the rack 12 heretofore referred to as operated from one of the cams on the shaft 2. The connection between the cam 30 on the shaft 2 (Fig. 3) and the rack bar 12, will be seen by reference to Fig. 5. This connection includes the lever arm 31 pivoted at 32 upon the bracket 33 and carrying at its inner end the roller 34 engaging the cam, and the rod 35. This rod is pivoted at its upper end to the rack as indicated at 36 and at its lower end to the lever 31, as indicated at 37, a plurality of holes being provided at the ends of the lever and bar to permit of adjustment. The spring 38 serves to hold the rolle 34 in contact with the cam and causes the rack to move upward to bring the turnover plate to the position indicated in Fig. 5 when the curvature of the cam 30 permits it. This, of course, curves at suitable timed intervals, the turnover plate always being in the position indicated in Fig. 5 at the moment a blank is discharged into the chute. At this time, the mold table 8 is being moved to bring one of its cavities 9 into position opposite the turnover plate in order to receive a blank. The relation of the turnover plate to the mold cavity is such that when the plate is turned through a distance of 180 degrees from the position of Fig. 5, bringing it to the dotted line position marked x, the center line of the blank is brought approximately in line with the center line 39 of the mold cavity. By this means, the blank is positioned with accuracy and certainty in the mold cavity, and in practically all cases, it will drop into such cavity and lie flat therein ready for engagement by the plunger 13. This transfer occurs after the table has come to a stop with its cavity in position to receive the blank, and at this period of rest, the mold plunger is operated to press the blank in the next preceding mold cavity into circular form, completely filling the cavity. The timing of the parts is such that as soon as the plunger is withdrawn and the cam 30 secures the movement of the turnover plate back to the position of Fig. 5, the operating mechanism of the press rotates the table ahead one step to bring the next cavity of the table into proper position, after which the cycle is repeated. The turnover device not only performs the function of inverting the blanks, but insures a positive transfer of the blanks from the chute to the mold cavities such as could not be secured if the chute led to a position over the cavities so that the transfer depended merely upon gravity. With such gravity feed alone, the blanks tend to stick due to their high temperature and plasticity. The impact incident to the operation of the turnover plate jars the blanks out of such plate and down into the mold cavities.

What I claim is:

1. The combination with a tunnnel heating chamber provided with a continuous carrier for optical blanks, and a molding or pressing machine adjacent the exit end of the chamber provided with mold cavities and plunger means for pressing the blanks in such cavities, of transfer means intermediate the carrier and the pressing machine, and means for discharging the blanks from the carrier to the transfer means comprising, a driven endless pusher member provided at intervals with blank engaging devices and arranged with one flight extending across the carrier so that the engaging devices will push the blanks across the carrier to said transfer means.

2. The combination with a tunnel heating chamber provided with a continuous carrier for optical blanks, and a molding or pressing machine adjacent the exit end of the chamber provided with mold cavities and plunger means for pressing the blanks in such cavities, of an inclined transfer chute leading from the side of the carrier to the pressing machine, and an endless driven pushing device arranged with one flight thereof extending across the top of the carrier in line with the chute and provided with spaced pusher members adapted to engage the blanks on the carrier and slide them across the top thereof into the end of said chute.

3. The combination with a tunnel heating chamber provided with a continuous carrier for optical blanks, and a molding or pressing machine adjacent the exit end of the chamber provided with mold cavities and plunger means for pressing the blanks in such cavities, of means for moving the blanks from the carrier, a turnover device at the side of the machine comprising a plate or member in position to receive the blanks from the carrier upon its upper face and pivoted for movement through 180 degrees in such position that when it is turned over it will deposit the blanks in said sockets, and means for operating the turnover device in timed relation with respect to said means for moving the blanks and with respect to the operation of said machine.

4. The combination with a tunnel heating chamber provided with a continuous carrier for optical blanks, and a molding or pressing machine adjacent the exit end of the chamber provided with mold cavities and plunger means for pressing the blanks in such cavities, of means for moving the blanks from the carrier, an inclined chute between the carrier and said machine for receiving the blanks from the carrier, and a turnover device at the side of the machine in position to receive the blanks from the chute upon its upper face, and pivoted for movement through 180 degrees in such position that when it is turned over, it will deposit the blanks in said sockets, and means for operating the turnover device in timed relation with respect to said means for moving the blanks and with respect to the operation of said machine.

5. The combination with a tunnel heating chamber provided with a continuous carrier for optical blanks, and a molding or pressing machine adjacent the exit end of the chamber provided with mold cavities and plunger means for pressing the blanks in such cavities, of means for moving the blanks from the carrier, a turnover device at the side of the machine comprising a plate or member in position to receive the blanks from the carrier upon its upper face and pivoted for movement through 180 degrees in such position that when it is turned over, it will deposit the blanks in said sockets, and means for operating the turnover device in timed relation with respect to said means for moving the blanks and with respect to the operation of said machine, said upper face of the plate or member being provided with means for positioning the blanks thereon.

6. The combination with a tunnel heating chamber provided with a continuous carrier for optical blanks, and a molding or pressing machine adjacent the exit end of the chamber provided with mold cavities and plunger means for pressing the blanks in such cavities, of means for moving the blanks from the carrier, a turnover device at the side of the machine comprising a plate or member in position to receive the blanks from the carrier upon its upper face and pivoted for movement through 180 degrees in such position that when it is turned over, it will deposit the blanks in said sockets, and means for operating the turnover device in timed relation with respect to said means for moving the blanks and with respect to the operation of said machine, said upper face of the plate or member being provided with a recess for positioning the blanks thereon.

7. The combination with a tunnel heating chamber provided with a continuous carrier for optical blanks, and a molding or pressing machine adjacent the exit end of the chamber provided with mold cavities and plunger means for pressing the blanks in such cavities, of means for moving the blanks from the carrier, a turnover device at the side of the machine comprising a plate or member in position to receive the blanks from the carrier upon its upper face and pivoted for movement through 180 degrees in such position that when it is turned over, it will deposit the blanks in said sockets, and means for operating the turnover device in timed relation with respect to said means for moving the blanks and with respect to the operation of said machine, said upper face of the plate or member being provided with a recess, open on the side toward the carrier for positioning the blanks thereon.

8. The combination with a tunnel heating chamber provided with a continuous carrier for optical blanks, and a molding or pressing machine adjacent the exit end of the chamber provided with mold cavities and plunger means for pressing the blanks in such cavities, of means for moving the blanks from the carrier, an inclined chute between the carrier and said machine for receiving the blanks from the carrier, and a turnover device at the side of the machine in position to receive the blanks from the chute upon its upper face, and pivoted for movement through 180 degrees in such position that when it is turned over, it will deposit the blanks in said sockets, and means for operating the turnover device in timed relation with respect to said means for moving the blanks and with respect to the operation of said machine, said upper face of the plate or member being provided with means positioning the blanks thereon.

9. The combination with a tunnel heating chamber provided with a continuous carrier for optical blanks, and a molding or pressing machine adjacent the exit end of the chamber provided with mold cavities and plunger means for pressing the blanks in such cavities, of means for moving the blanks from the carrier, an inclined chute between the carrier and said machine for receiving the blanks from the carrier, and a turnover device at the side of the machine in position to receive the blanks from the chute upon its upper face, and pivoted for movement through 180 degrees in such position that when it is turned over it will deposit the blanks in said sockets, and means for operating the turnover device in timed relation with respect to said means for moving the blanks and with respect to the operation of said machine, said upper face of the plate or member being provided with a curved wall or shoulder open on the side toward the carrier and adapted to position the blanks and to round the corners of the blanks coming in contact therewith.

In testimony whereof, I have hereunto subscribed my name this 3rd day of May, 1924.

WILLIAM OWEN.